United States Patent
Yoshimura (10) Patent No.: US 11,990,814 B2
(45) Date of Patent: May 21, 2024

(54) ROTARY ELECTRIC MACHINE, STATOR THEREOF AND MANUFACTURING METHOD OF ROTARY ELECTRIC MACHINE

(71) Applicant: DENSO CORPORATION, Kariya (JP)

(72) Inventor: Masataka Yoshimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 395 days.

(21) Appl. No.: 17/391,510

(22) Filed: Aug. 2, 2021

(65) Prior Publication Data

US 2021/0367473 A1 Nov. 25, 2021

Related U.S. Application Data

(63) Continuation of application No. PCT/JP2020/003905, filed on Feb. 3, 2020.

(30) Foreign Application Priority Data

Feb. 26, 2019 (JP) ................................. 2019-032970

(51) Int. Cl.
*H02K 3/50* (2006.01)
*H01R 25/16* (2006.01)
*H02K 1/16* (2006.01)
*H02K 3/12* (2006.01)
*H02K 3/28* (2006.01)

(52) U.S. Cl.
CPC .......... *H02K 3/505* (2013.01); *H01R 25/162* (2013.01); *H02K 1/165* (2013.01); *H02K 3/12* (2013.01); *H02K 3/28* (2013.01); *H02K 2203/09* (2013.01)

(58) Field of Classification Search
CPC .......... H02K 3/505; H02K 3/50; H02K 1/165; H02K 3/12; H02K 3/28; H02K 2203/09; H02K 2213/03; H02K 15/12; H01R 25/162; H01R 25/16
See application file for complete search history.

(56) References Cited

U.S. PATENT DOCUMENTS

| 6,181,044 B1 | 1/2001 | Umeda et al. | |
| 6,462,453 B1* | 10/2002 | Asao | H02K 3/28 310/260 |
| 2004/0070293 A1 | 4/2004 | Kabasawa et al. | |
| 2006/0138884 A1 | 6/2006 | Kabasawa et al. | |
| 2012/0319512 A1* | 12/2012 | Nakagawa | H02K 1/278 310/71 |
| 2014/0232223 A1* | 8/2014 | Takasaki | H02K 3/28 310/71 |
| 2016/0020658 A1 | 1/2016 | Tamura | |

FOREIGN PATENT DOCUMENTS

JP 2018-125924 A 8/2018

\* cited by examiner

*Primary Examiner* — Tulsidas C Patel
*Assistant Examiner* — Joshua Kiel M Rodriguez
(74) *Attorney, Agent, or Firm* — Oliff PLC

(57) ABSTRACT

A connection unit is coupled to a coil end. The connection unit includes an insulator member. The insulator member includes a holder member and an insertion member. The insertion member is inserted into the coil end. A resin member includes a protective layer which protects a plurality of joint members. The resin member includes a bridge member which couples the insulator member and the joint member. The insertion member is a cylindrical shape. The insertion member is capable of accepting a plurality of joint members. The insertion member is capable of storing the resin member.

12 Claims, 8 Drawing Sheets

ROTARY ELECTRIC MACHINE, STATOR THEREOF AND MANUFACTURING METHOD OF ROTARY ELECTRIC MACHINE

CROSS REFERENCE TO RELATED APPLICATION

The present application is a continuation application of International Patent Application No. PCT/JP2020/003905 filed on Feb. 3, 2020, which designated the U.S. and claims the benefit of priority from Japanese Patent Application No. 2019-32970 filed in Japan filed on Feb. 26, 2019, the entire disclosure of the above application is incorporated herein by reference.

TECHNICAL FIELD

The disclosure in this specification relates to a rotary electric machine, a stator thereof, and a manufacturing method of the rotary electric machine.

BACKGROUND

A stator of a rotary electric machine may have a variety of coil ends. A bus bar and a bus bar module may be used to provide an electrically connecting conductors at the coil end.

SUMMARY

In the case that one or more connection conductor is fixed to the coil end, secure fixing is required. In view of the above or other aspects not mentioned, there is a need for further improvements in a rotary electric machine, a stator thereof, and a manufacturing method of the rotary electric machine.

A stator of a rotary electric machine disclosed herein, comprises: a coil end which protrudes axially from the stator core; a connection unit which is arranged in the axial direction of the coil end and includes a connection conductor; an insertion member which extends from the connection unit toward the coil end and is inserted into the coil end; and a bridge member which is provided by a resin member, is positioned between the coil end and the insertion member, and couples the coil end and the insertion member.

According to the stator of the rotary electric machine disclosed, the insertion member inserted into the coil end performs reliable positioning. Further, a bridge portion made of a resin member is positioned between the coil end and the insertion member to couple the coil end and the insertion member. The bridge member prevents the insertion member from dropping off. As a result, the connection conductor is securely fixed.

The rotary electric machine disclosed herein includes the stator of the rotary electric machine, a rotor magnetically coupled to the stator, and a housing which accommodates the stator and the rotor.

A manufacturing method of the rotary electric machine disclosed herein, comprises: an inserting step of inserting an insertion member extending from a connection unit including the connection conductor into a coil end protruding axially from the stator core; and a coupling step of forming a bridge member which couples the coil end and the insertion member, and is positioned between the coil end and the insertion member, and applying a resin member between the coil end and the insertion member.

According to the method of manufacturing the rotary electric machine disclosed, the insertion member inserted into the coil end performs reliable positioning. Further, the bridge member made of the resin member prevents the insertion member from dropping off. As a result, the connection conductor is securely fixed.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

BRIEF DESCRIPTION OF DRAWINGS

The disclosure is further described with reference to the accompanying drawings in which.

DESCRIPTION OF EMBODIMENT

An example of a stator and a rotary electric machine is disclosed in JP2016-25743A, JP2000-166150A and JP2018-125924A, respectively. These stators have a variety of coil ends. A bus bar module may provide an electrically connecting conductors at the coil end. The contents of JP2016-25743A, JP2000-166150A and JP2018-125924A are incorporated by reference as explanation of technical elements in this specification. It is an object of an embodiment to provide a rotary machine, a stator thereof, and a method of manufacturing the rotary machine in which one or more connection conductors are securely fixed. It is another object of one embodiment to provide an easy-to-manufacture rotary machine, a stator thereof, and a method of manufacturing the rotary machine.

Several embodiments will be described with reference to the drawings. In some embodiments, parts which are functionally and/or structurally corresponding and/or associated are given the same reference numerals, or reference numerals with different hundreds digit or higher digits. For corresponding parts and/or associated parts, reference can be made to the description of other embodiments.

First Embodiment

Figure 1:
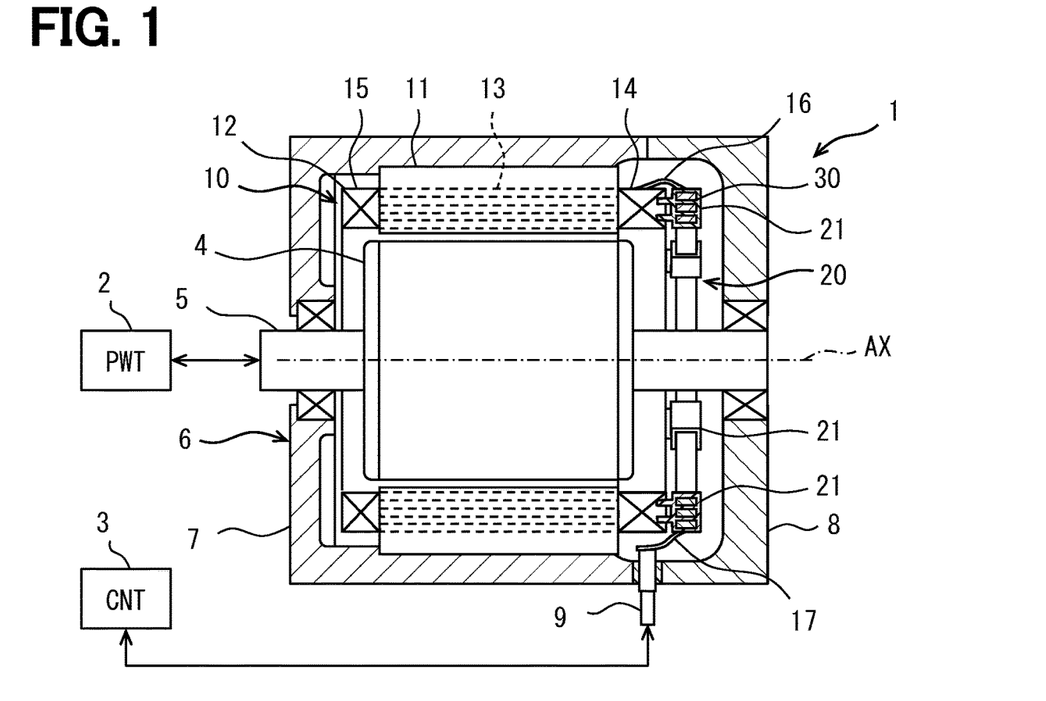
FIG. 1 is a cross-sectional view showing a rotary electric machine according to a first embodiment.

In FIG. 1, the rotary electric machine 1 is a motor generator. The rotary electric machine 1 is operatively coupled to a power system 2 (PWT) of the device. The rotary electric machine 1 can function as a generator that generates electric power using power supplied from the power system 2. The rotary electric machine 1 can function as an electric motor that supplies power to the power system 2. The rotary electric machine 1 may be a generator or an electric motor. The power system 2 may include an internal combustion engine. The power system 2 provides a main power for an apparatus. In this specification, the apparatus includes a vehicle, an air conditioner, a pumping device, and the like. Furthermore, the term vehicle includes a car, a ship, an aircraft, a simulation device, and an amusement device.

The rotary electric machine 1 is electrically connected to the control device 3 (CNT). The control device 3 includes an inverter circuit. When the rotary electric machine 1 functions as a generator, it is driven by the power system 2 and outputs electric power. The control device 3 functions as a rectifier circuit that rectifies the electric power output from the rotary electric machine 1 when the rotary electric machine 1 is used as a generator. The rotary electric machine 1 may assist the rotation of the power system 2 when functioning as an electric motor. The control device 3 supplies poly-phase AC power to the rotary electric machine 1 when the rotary electric machine 1 is used as an electric motor. In this embodiment, the poly-phase AC power is three-phase power.

The control device 3 is an electronic control unit. The control device 3 provides a control system. The control system has at least one arithmetic processing unit (CPU) and at least one memory device (MMR) as a storage medium for storing programs and data. The control system is provided by a microcomputer comprising a computer readable storage medium. The storage medium is a non-transitional tangible storage medium that non-temporarily stores a computer readable program. The storage medium may be provided as a semiconductor memory, a magnetic disk, or the like. The control system may be provided by one computer or a group of computer resources linked via a data communication device. Means and/or functions provided by the control system can be provided by software recorded in a substantive memory device and a computer that can execute the software, software only, hardware only, or some combination of them. For example, the control system can be provided by a logic called if-then-else type, or a neural network tuned by machine learning. Alternatively, for example, if the control system is provided by an electronic circuit that is hardware, the control system may be provided by a digital circuit or an analog circuit that includes a large number of logic circuits.

The rotary electric machine 1 has a rotor 4 and a stator 10. The rotor 4 may rotate around an axis AX. The stator 10 is a cylindrical member having the axis AX. In the following description, the terms axial, radial, and circumferential are defined by the axis AX. The rotor 4 and the stator 10 are accommodated in a housing 6. The housing 6 fixes the stator 10 and supports the rotor 4 in a rotatable manner. The housing 6 may provide components of the power system 2. For example, the housing 6 may provide a part of a crankcase or a part of a transmission case. The housing 6 has a first housing 7 with a bottomed cylindrical shape and a second housing 8 with a bottomed cylindrical shape. The rotor 4 and the stator 10 are accommodated between a first housing 7 and a second housing 8.

The rotor 4 is magnetically coupled with the stator 10. The rotor 4 is supported by a shaft 5 so as to be rotatable with respect to the housing 6. The shaft 5 provides a rotation axis. The rotation axis is coupled to the power system 2. The rotor 4 is disposed on a radially inner side of the stator 10. The rotor 4 has a plurality of magnetic poles arranged along the circumferential direction. The plurality of magnetic poles are formed by a plurality of permanent magnets embedded in the rotor 4. The rotor 4 can be provided by various structures. The rotor 4 has, for example, 8 (N pole: 4 pieces, S pole: 4 pieces) magnetic poles.

The rotary electric machine 1 has a power terminal member 9. The rotary electric machine 1 has a plurality of power terminal members 9. The power terminal member 9 is a terminal for electrically connecting the rotary electric machine 1 and the control device 3. The power terminal member 9 is used as an output terminal member when outputting electric power, and as an input terminal member when receiving electric power. The power terminal member 9 can also be called an external connection terminal member of the rotary electric machine 1.

The stator 10 has a stator core 11. The stator core 11 is a cylindrical shape. The stator core 11 is an annular shape. The stator core 11 has a plurality of steel plates laminated along the axial direction. The stator core 11 has a plurality of slots arranged in the circumferential direction. The plurality of slots are arranged at an equal pitch with respect to the circumferential direction. The plurality of slots may be arranged at several different pitches. The plurality of slots extend in the axial direction so as to penetrate the plurality of steel plates. Further, the plurality of slots extend in the radial direction. A typical stator core 11 has an annular back core. The stator core 11 has a plurality of teeth extending out in the radial direction inside from the back core. The plurality of teeth form a plurality of slots between them.

The stator 10 has a stator coil 12. The stator coil 12 is attached to the stator core 11. The stator coil 12 has straight members 13 and coil ends 14 and 15. The straight member 13 extends straight along the axial direction. The straight member 13 is accommodated in the slot. The coil ends 14 and 15 are positioned at ends of the stator core 11. The coil ends 14 and 15 protrude from the stator core 11 in the axial direction. The coil ends 14 and 15 are bundles of a plurality of segment conductors included in the stator coil 12. At the coil ends 14 and 15, one segment conductor connects one straight member 13 positioned in one slot to one straight member 13 positioned in another different slot. The coil ends 14 and 15 may be provided by continuous turn members of the segment conductor. The coil ends 14 and 15 may be provided by joint members joining different segment conductors. These examples are disclosed in Patent Literature 1, Patent Literature 2 or Patent Literature 3.

The stator coil 12 has a lead wire 16 extending from the coil end 14. The stator coil 12 includes a plurality of lead wires 16. The lead wires 16 provide both ends of a plurality of coils as a poly-phase winding. In this embodiment, since a three-phase winding is provided, at least six lead wires 16 are provided. Further, in this embodiment, one phase is provided by the parallel connection of "n" coils. Therefore, the stator coil 12 has 6×n pieces of the lead wires 16. In this embodiment, one phase is provided by a parallel connection of two coils. Therefore, the stator coil 12 includes 12 pieces of the lead wires 16.

One coil can be provided by a continuous wire or by joining multiple segments. In this embodiment, a single coil is provided by a plurality of joined segments. Note that the plurality of segments can be joined by various joining methods. As a joining method, for example, TIG welding, electric resistance welding, solder joining, or the like can be used. In addition, one coil is a coil that can be regarded as one phase. One coil may include a plurality of coil elements having different electrical angles. For example, one coil can include a plurality of coil elements having electrical angles that differ by several degrees.

The stator coil 12 has a connection unit 20. The connection unit 20 electrically connects the stator coil 12 so as to form a poly-phase connection. The connection unit 20 connects a plurality of lead wires 16 so as to provide a star connection or a delta connection. In this embodiment, the connection unit 20 provides the star connection. The connection unit 20 includes a plurality of connection conductors 30. The plurality of connection conductors 30 are connection members for the stator coil 12. The plurality of connection conductors 30 are made of a conductive member. The connection unit 20 has end conductors which provide three input or output terminal ends (power terminal ends) in the star connection. The connection unit 20 has a neutral point conductor which provides a neutral point in the star connection. The connection conductor 30 is not accommodated in the stator core 11 as the stator coil 12. The connection conductor 30 provides the connection required as the winding of the rotary electric machine 1. The connection conductor 30 may be provided by a conductor different from that of the stator coil 12. It may be provided by the same conductor as the stator coil 12. The connection conductor 30 itself has an insulator film. The connection conductor 30 is also called a bus bar.

The connection unit 20 has at least one insulator member 21. The connection unit 20 has a plurality of insulator members 21 arranged along the coil end 14 in a distributive manner. The insulator member 21 is made of an insulating material. The insulator member 21 is a molded product made of an insulating resin. The insulator member 21 holds the plurality of connection conductors 30 in an electrically insulated state. The insulator member 21 is a resin insert-molded product that wraps a part of at least one connection conductor 30 by insert molding. The insulator member 21 is also a container for accommodating the connection conductor 30 inside. The insulator member 21 is arranged outside the coil end 14 in the axial direction. The insulator member 21 does not protrude from the coil end 14 with respect to both the inner side and the outer side in the radial direction. That is, in the radial direction, the insulator member 21 is arranged within an extension range of the coil end 14. The insulator member 21 faces the outer surface of the coil end 14 in the radial direction.

The insulator member 21 integrates the plurality of connection conductors 30 in a state of being electrically insulated from each other so that the plurality of connection conductors 30 are capable of being handled as a single component. Each insulator member 21 has a rectangular cubic shape or a lump shape curved in an arc shape.

The insulator member 21 may be made of an insulator member such as ceramic. The insulator member 21 may be a polyhedron. The plurality of insulator members 21 may be coupled to each other along the circumferential direction. For example, the insulator member 21 may have an arc shape or an annular shape extending along the coil end 14.

In FIG. 1, the inside of the insulator member 21, particularly the connection conductor 30, is schematically illustrated in a slightly emphasized manner. Each of the plurality of connection conductors 30 is electrically connected to each of the plurality of lead wires 16. The plurality of connection conductors 30 provide a plurality of collective terminal members 17. The collective terminal 17 is also called a power connection terminal member. The plurality of collective terminals 17 are electrically connected to the plurality of power terminal members 9. The collective terminal member 17 extends from the insulator member 21.

Figure 2:
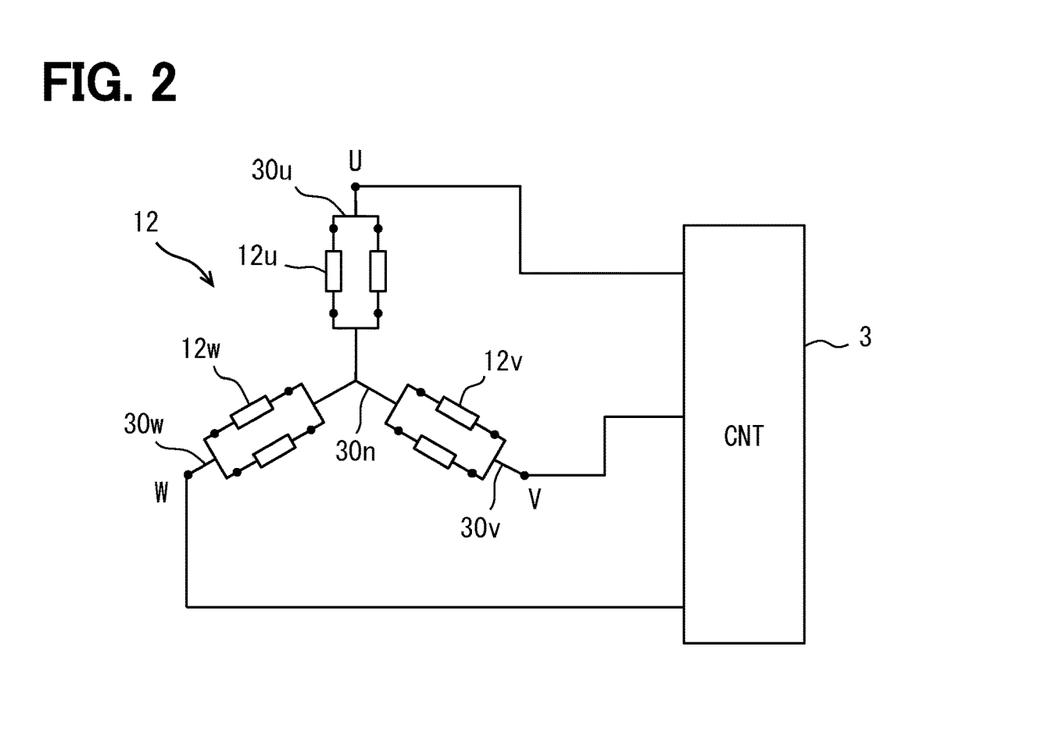
FIG. 2 is a circuit diagram showing a stator coil.

FIG. 2 shows a poly-phase connection of the stator coil 12. The stator coil 12 employs the star connection as a poly-phase connection. The stator coil 12 has a U phase, a V phase, and a W phase. The stator coil 12 has a plurality of U-phase coils 12u that provide U-phase. The stator coil 12 has a plurality of V-phase coils 12v that provide V-phase. The stator coil 12 has a plurality of W-phase coils 12w that provide W-phase. The stator coil 12 may include one or more phase coils in one phase. Further, the stator coil 12 may include a plurality of sets of poly-phase connections. In this embodiment, the stator coil 12 has two U-phase coils 12u, two V-phase coils 12v, and two W-phase coils 12w. The stator coil 12 includes a set of poly-phase connections.

The plurality of connection conductors 30 have a U-phase connection conductor 30u that provides a U-phase power terminal end. The U-phase connection conductor 30u is connected to a plurality of U-phase coils 12u at a plurality of joint members, respectively. The U-phase connection conductor 30u is connected to the corresponding power terminal member 9. Therefore, the U-phase connection conductor 30u provides a so-called crossover wire which connects four U-phase coils 12u to the power terminal end. The plurality of connection conductors 30 have a V-phase connection conductor 30v that provides a V-phase power terminal end. The U-phase connection conductor 30u is connected to a plurality of U-phase coils 12u at a plurality of joint members, respectively. The V-phase connection conductor 30v is connected to the corresponding power terminal member 9. Therefore, the V-phase connection conductor 30v provides a so-called crossover wire that connects four V-phase coils 12v to the power terminal end. The plurality of connection conductors 30 have a W-phase connection conductor 30w that provides a W-phase power terminal end. The W-phase connection conductor 30w is connected to a plurality of W-phase coils at a plurality of joint members, respectively. The W-phase connection conductor 30w is connected to the power terminal member 9. Therefore, the W-phase connection conductor 30w provides a so-called crossover wire that connects four W-phase coils 12w to the power terminal end. The plurality of connection conductors 30 include a neutral point connection conductor 30n. The neutral point connection conductor 30n provides the star connection. One neutral point connection conductor 30n is joined to the coil terminal ends for the neutral points of the plurality of phase coils 12u, 12v, and 12w at the plurality of joint members.

Figure 3:
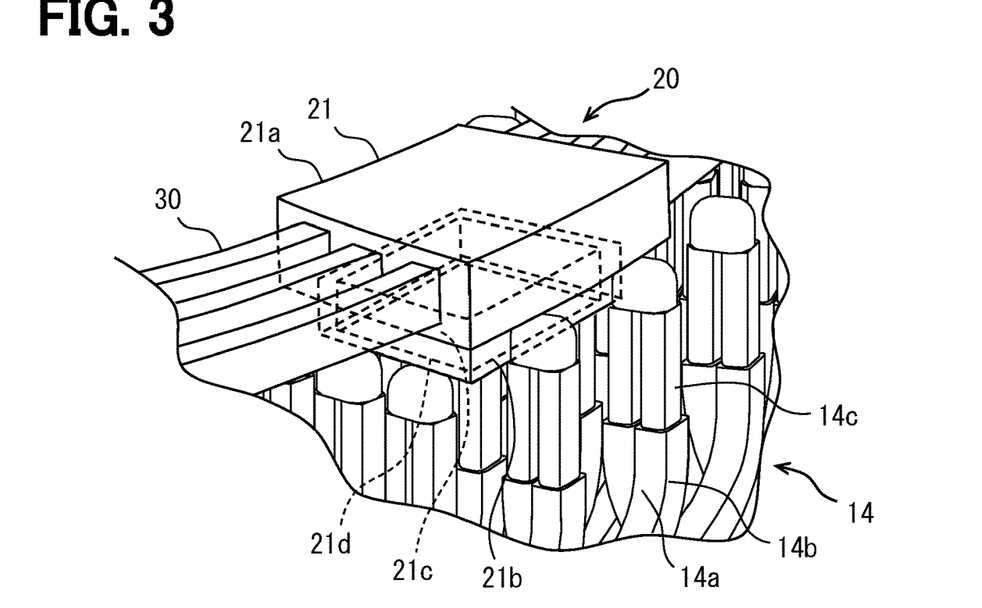
FIG. 3 is an enlarged perspective view showing a coil end and a wiring unit.

In FIG. 3, a relationship between one insulator member 21 and the coil end 14 is illustrated. The connection unit 20 is arranged in the axial direction of the coil end 14. The connection unit 20 is fixed by adhering the insulator member 21 to the coil end 14.

The insulator member 21 has a holder member 21a which holds the connection conductor 30. The holder member 21a holds the plurality of connection conductors 30 in a separated state from each other. The holder member 21a provides electrical insulation of the plurality of connection conductors 30. The insulator member 21 is a resin insert molded product that wraps a part of at least one connection conductor 30 by insert molding.

The insulator member 21 has an insertion member 21b. The insertion member 21b extends from the connection unit 20 toward the coil end 14. The insertion member 21b extends from the holder member 21a toward the coil end 14. The holder member 21a and the insertion member 21b are integrally formed of a continuous resin material. The insertion member 21b is inserted into the coil end 14. The insertion member 21b is inserted into a gap between the plurality of segment conductors 14a forming the coil end 14. In other words, the insertion member 21b is inserted between the plurality of segment conductors 14a in a penetrative manner.

Figure 4:
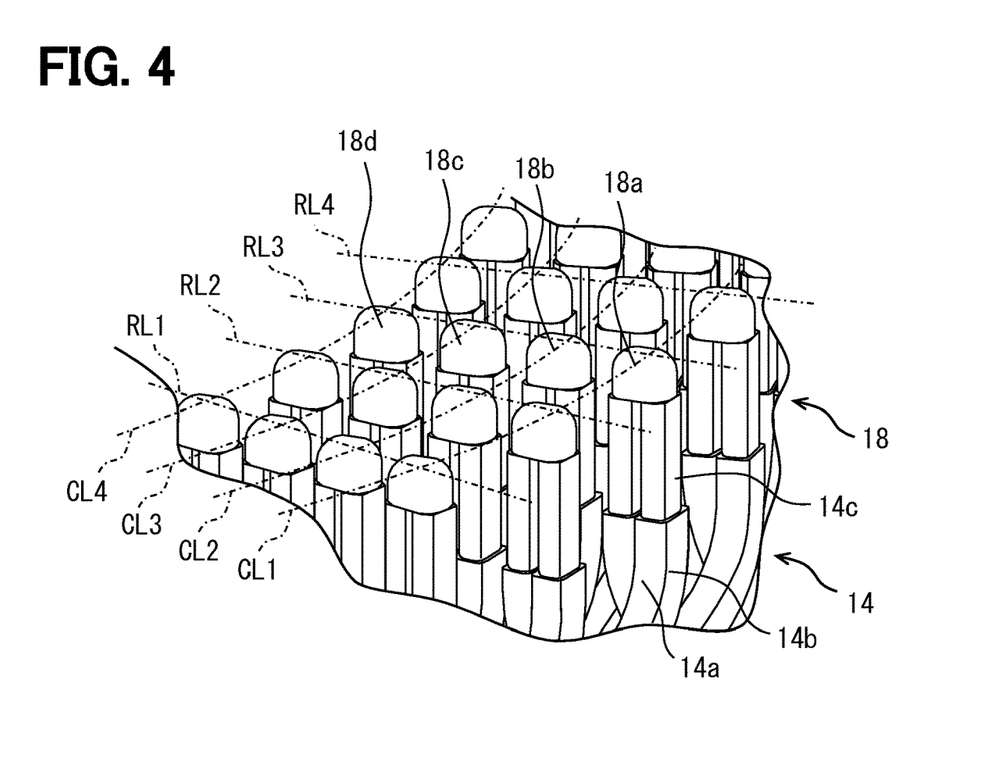
FIG. 4 is an enlarged perspective view showing a coil end.

In FIG. 4, the coil end 14 before the connection unit 20 is mounted is illustrated. The coil end 14 is an aggregate of a plurality of segment conductors 14a as windings. The coil end 14 has gaps which are capable of accepting the insertion member 21b. In other words, the plurality of segment conductors 14a form circumferential gaps and radial gaps at the coil end 14. The coil end 14 has a plurality of conductor wires 14b. The plurality of conductor wires 14b are covered with an insulator film. The coil end 14 has a plurality of bare wires 14c. A bare wire 14c is a member of which the insulator film is removed from the conductor wire 14b.

Further, the coil end 14 has a plurality of joint members 18 which mechanically and electrically connect two bare wires 14c. The plurality of joint members 18 are regularly arranged on the coil end 14. The plurality of joint members 18 are arranged in an aligned state on the coil end 14. The plurality of joint members 18 are welding marks formed by welding.

The plurality of joint members 18 are separately arranged from each other in the radial direction and form radial gaps from each other. The radial gap has a width which is capable of accommodating the insertion member 21b. The plurality of joint members 18 are separately arranged from each other in the circumferential direction and form circumferential gaps from each other. The circumferential gap has a width which is capable of accommodating the insertion member 21b.

In a range illustrated in the drawing, the plurality of joint members 18 are arranged on the coil end 14 so as to form radial trains RL1, RL2, RL3, RL4 extending along the radial direction. The radial train may be inclined with respect to the radial direction. The circumferential gap is formed between two radial trains adjacent to each other (for example, between the radial train RL1 and the radial train RL2, and between the radial train RL3 and the radial train RL4). In this embodiment, one radial train includes the joint members 18a, 18b, 18c and 18d.

The plurality of joint members 18 are arranged on the coil end 14 so as to form a plurality of annular rows CL1, CL2, CL3 and CL4. The annular row CL1 forms the outermost layer at the coil end 14. The annular row CL1 may be also referred to as an outermost layer. The annular row CL1 includes a plurality of joint members 18a. The plurality of joint members 18a belonging to the annular row CL1 are separately arranged from each other in the circumferential direction. The annular row CL2 forms an intermediate layer at the coil end 14. The annular row CL2 may be also referred to as a first intermediate layer or an outer intermediate layer. The annular row CL2 includes a plurality of joint members 18b. The plurality of joint members 18b belonging to the annular row CL2 are separately arranged from each other in the circumferential direction. The annular row CL3 forms an intermediate layer at the coil end 14. The annular row CL3 may be also referred to as a second intermediate layer or an inner intermediate layer. The annular row CL3 includes a plurality of joint members 18c. The plurality of joint members 18c belonging to the annular row CL3 are separately arranged from each other in the circumferential direction. The annular row CL4 forms the innermost layer at the coil end 14. The annular row CL4 may be also referred to as an innermost layer. The annular row CL4 includes a plurality of joint members 18d. The plurality of joint members 18d belonging to the annular row CL4 are separately arranged from each other in the circumferential direction. The radial gap is formed between two annular rows adjacent to each other (for example, between the annular row CL1 and the annular row CL2, and between the annular row CL3 and the annular row CL4).

Figure 5:
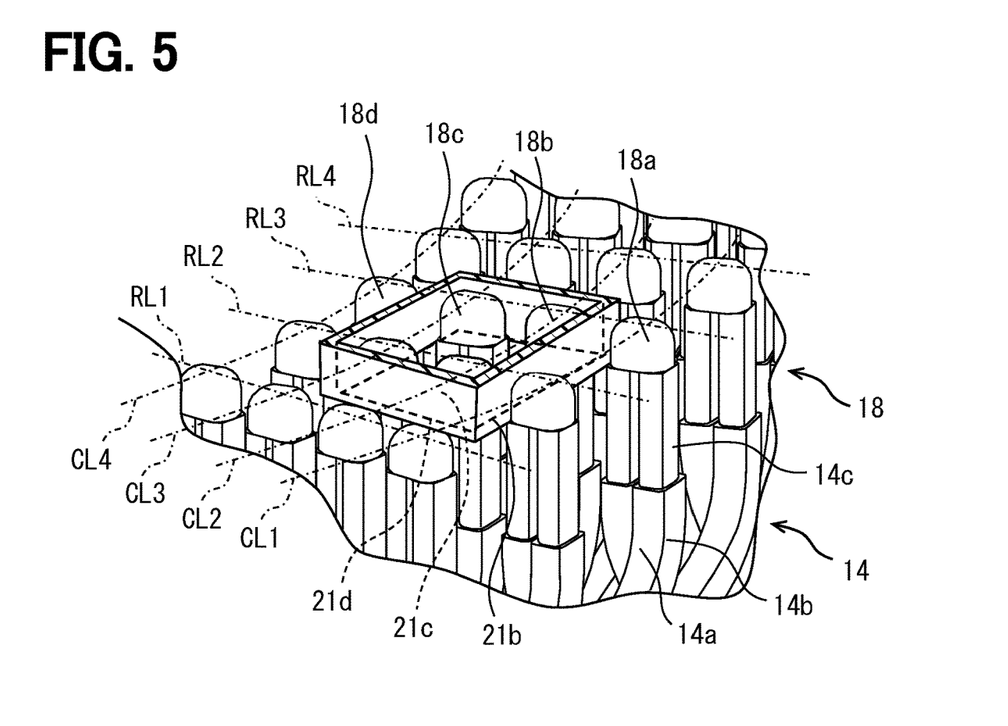
FIG. 5 is an enlarged perspective view showing an insertion member.

In FIG. 5, the insertion member 21b is illustrated. The cross section in the drawing illustrates a cross section of a resin material which extends continuously between the holder member 21a and the insertion member 21b. The insertion member 21b extends from the holder member 21a toward the coil end 14. The insertion member 21b is positioned between the plurality of joint members 18. The insertion member 21b may reach between the plurality of bare wires 14c. As a result, the insertion member 21b and the plurality of joint members 18 are partially in contact with each other. Further, a plurality of bridge gaps are left between the insertion member 21b and the plurality of joint members 18.

Further, the insertion member 21b includes both a wall inserted into the circumferential gap and a wall inserted into the radial gap. As a result, the insertion member 21b and the coil end 14 mechanically mesh with each other in both the circumferential direction and the radial direction. As a result, the connection unit 20 is positioned with respect to the coil end 14.

The insertion member 21b is positioned between the radial train RL1 and the radial train RL2. The insertion member 21b is positioned between the radial train RL4 and the radial train RL3. In other words, the insertion section 21b is positioned between two adjacent radial trains. The insertion member 21b is positioned between the annular row CL1 and the annular row CL2. In other words, the insertion member 21b is positioned between the outermost layer and the intermediate layer. The insertion member 21b is positioned between the annular row CL4 and the annular row CL3. In other words, the insertion member 21b is positioned between the innermost layer and the intermediate layer.

In addition, the insertion member 21b is a cylindrical member. The insertion member 21b is a polygonal cylinder. The insertion member 21b is a quadrilateral cylinder. The insertion member 21b forms a container chamber 21c inside. The container chamber 21c accommodates one or more joint members 18b and 18c. The insertion member 21b has a holder member 21a (closed end) at an upper end in the drawing. The insertion member 21b has an opening portion 21d at a lower end in the drawing. The container chamber 21c is open so as to face the coil end 14. The insertion member 21b is a tubular member which is closed at one end. The insertion member 21b has an opening portion 21d for receiving one or more joint members 18b and 18c. In other words, the insertion member 21b receives the joint members 18b and 18c of the intermediate layer from the opening portion 21d. In the illustrated example, the insertion member 21b receives the four joints 18b, 18c from the opening portion 21d. As a result, the insertion member 21b is positioned between the two adjacent radial trains RL1 and RL2. The insertion member 21b is positioned between two adjacent radial trains RL3 and RL4. The insertion member 21b is arranged between the outermost layer (annular row CL1) and the intermediate layer (annular row CL2). Further, the insertion member 21b is arranged between the innermost layer (annular row CL4) and the intermediate layer (annular row CL3). The insertion member 21b functions as a container for holding a fluid or fluidic material against the gravity when the opening portion 21d is directed upward in the direction of the gravity.

Figure 6:
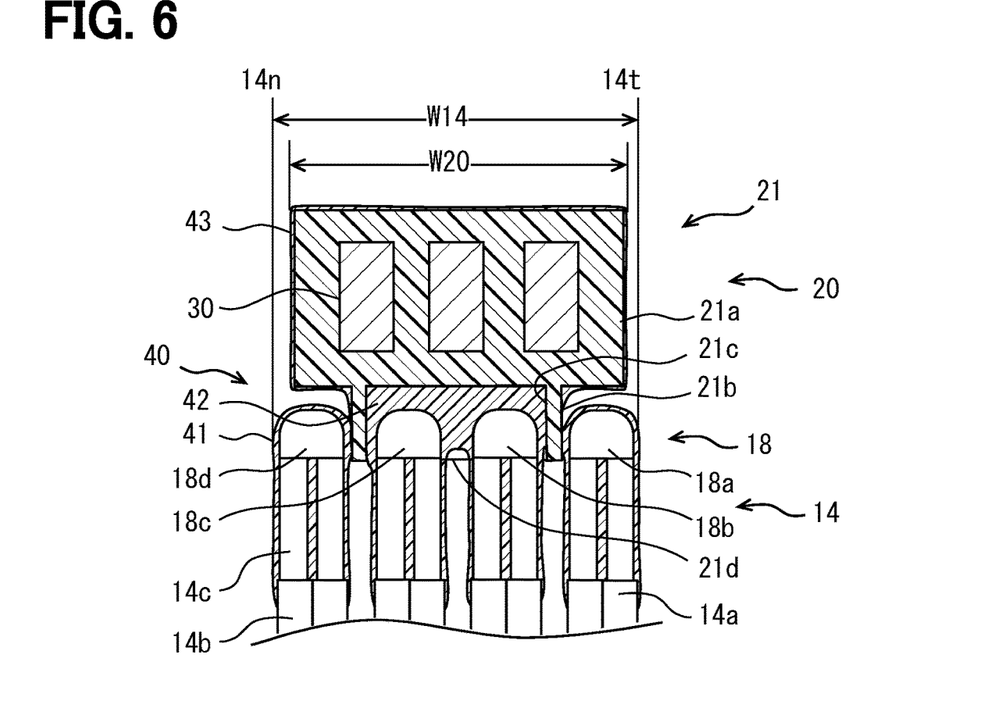
FIG. 6 is a partial cross-sectional view showing a stator.

In FIG. 6, an enlarged cross section of the insulator member 21 is illustrated. The connection unit 20 is positioned in the axial direction with respect to the coil end 14. The coil end 14 has a width W14 in the radial direction. The holder member 21a has a width W20 in the radial direction. The holder member 21a is arranged on a radial inside than a radial outside end 14t of the coil end 14 with respect to the radial direction. As a result, a protrusion of the stator 10 in the radial outside is suppressed at the end member. The holder member 21a is arranged on a radial outside than a radial inside end 14n of the coil end 14 with respect to the radial direction. As a result, a protrusion of the stator 10 in the radial inside is suppressed at the end member. Since the connection unit 20 is compactly arranged at the end member of the stator 10, interference between the stator 10 and the housing 6 and/or interference between the stator 10 and the rotor 4 is suppressed.

The coil end 14 includes a resin member 40. The resin member 40 includes a protective layer 41 for protecting the coil end 14. The protective layer 41 covers the bare wire 14c and the joint member 18.

The resin member 40 includes a bridge member 42. The bridge member 42 is formed of a resin member. The bridge member 42 and the protective layer 41 are formed by a continuous resin member 40. The bridge member 42 couples between the coil end 14 and the connection unit 20. In other words, the bridge member 42 adheres the coil end 14 and the connection unit 20 to each other. The bridge member 42 bridges between the insertion member 21b and the coil end 14. The bridge member 42 fills the bridge gap. The bridge member 42 is positioned between the coil end 14 and the insertion member 21b. The bridge member 42 couples the coil end 14 and the insertion member 21b. The bridge member 42 firmly couples the joint members 18b and 18c positioned within the container chamber 21c and the connection unit 20. In the illustrated example, the bridge member 42 substantially fills the inside of the container chamber 21c.

The resin member 40 includes a coating layer 43. The coating layer 43 covers the connection unit 20. The coating layer 43 covers the insulator member 21. The coating layer 43 covers the exposed surface of the connection conductor 30.

The joint member 18 at the coil end 14 has a coefficient of linear expansion AL18. The insulator member 21 has a coefficient of linear expansion AL21. The resin member 40 has a coefficient of linear expansion AL40. These linear expansion coefficients satisfy a relationship expressed by the following mathematical formula: AL18≤AL40≤AL21. This relationship contributes to suppress a peeling between the joint member 18 and the resin member 40 and to suppress a peeling between the resin member 40 and the insulator member 21.

Figure 7:
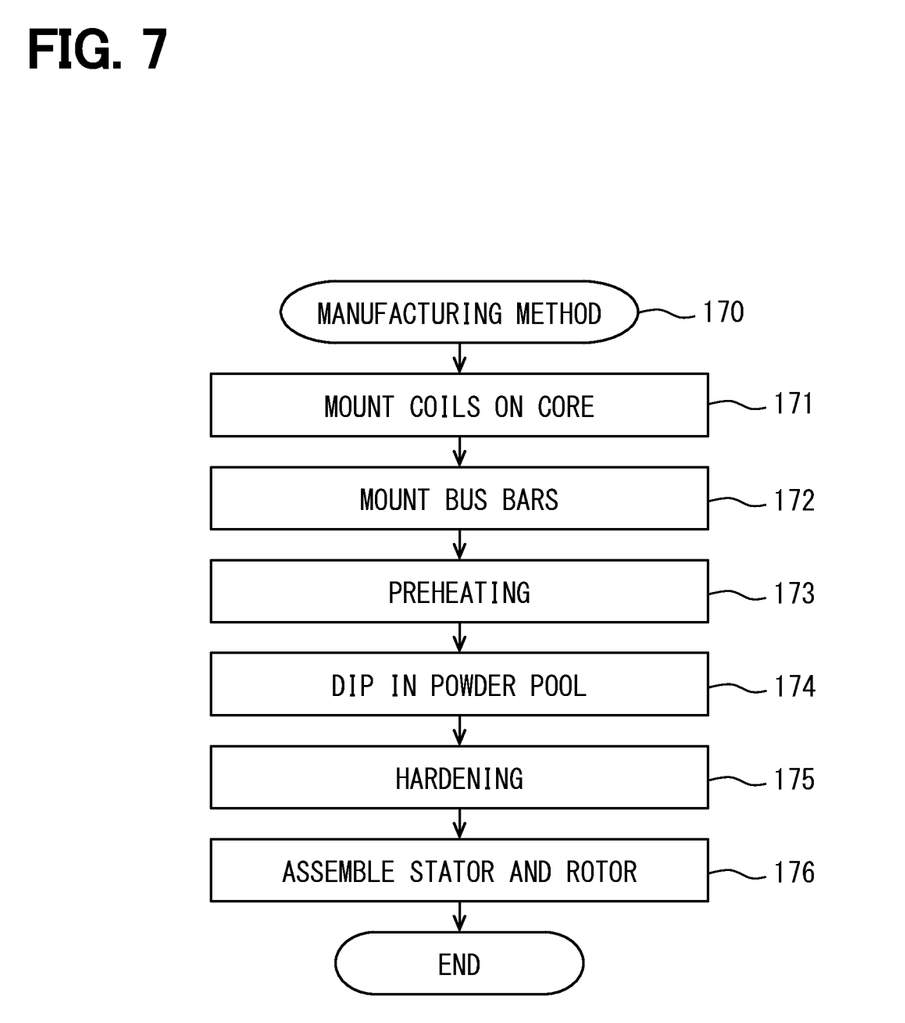
FIG. 7 is a flowchart showing a method of manufacturing a rotary electric machine.

FIG. 7 shows a manufacturing method of the rotary electric machine 1. The method 170 for manufacturing a rotary electric machine includes a plurality of steps 171-176. Manufacturing method 170 includes a preparatory step of preparing a plurality of components.

Step 171 provides a winding step of mounting the winding on the stator core 11. This step includes, for example, a step of mounting the plurality of segment conductors 14a on the stator core 11 and a step of forming a plurality of joint portions 18 at the coil end 14. Therefore, step 171 includes a joining step of forming a plurality of joint portions 18 by connecting the plurality of segment conductors 14a.

Step 172 provides an insertion step of inserting the insertion member 21b extending from the connection unit 20 into the coil end 14 projecting axially from the stator core 11. Step 172 is also a temporary fixing step of temporarily fixing the connection unit 20 to the coil end 14. In this step, the connection unit 20 is temporarily fixed to the coil end 14 by inserting the insertion member 21b into the coil end 14. Further, by connecting the lead wire 16, the connection unit 20 is temporarily fixed to the coil end 14. The coil end 14 and the connection unit 20 are temporarily fixed so that the connection unit 20 does not fall off even if the connection unit 20 is positioned below the coil end 14 in the direction of the gravity.

Steps 173, 174, and 175 provide an applying step of applying the resin member 40. In this step, the resin member 40 is applied between the coil end 14 and the insertion member 21b. Steps 173, 174, and 175 provide a coupling step of coupling the coil end 14 and the connection unit 20 by a bridge member 42. This coupling step is also a protective step of forming a protective layer 41 which covers the plurality of joint members 18 by the resin member 40. The coupling step and the protecting step are executed at the same time. The applying step is also a powder coating step of applying the resin member 40 as a powder.

Step 173 provides a preheating step of preheating a portion to which the resin member 40 is applied. In this embodiment, since the resin member 40 is applied to the coil end 14 and the connection unit 20, the coil end 14 and the connection unit 20 are preheated. Step 174 provides a powder step of immersing the coil end 14 and the connection unit 20 in a powder tank. In the powder step, the raw material powder of the resin member 40 is applied to the coil end 14 and the connection unit 20. In the powder step, it may be said that the resin member 40 before curing is applied.

Figure 8:
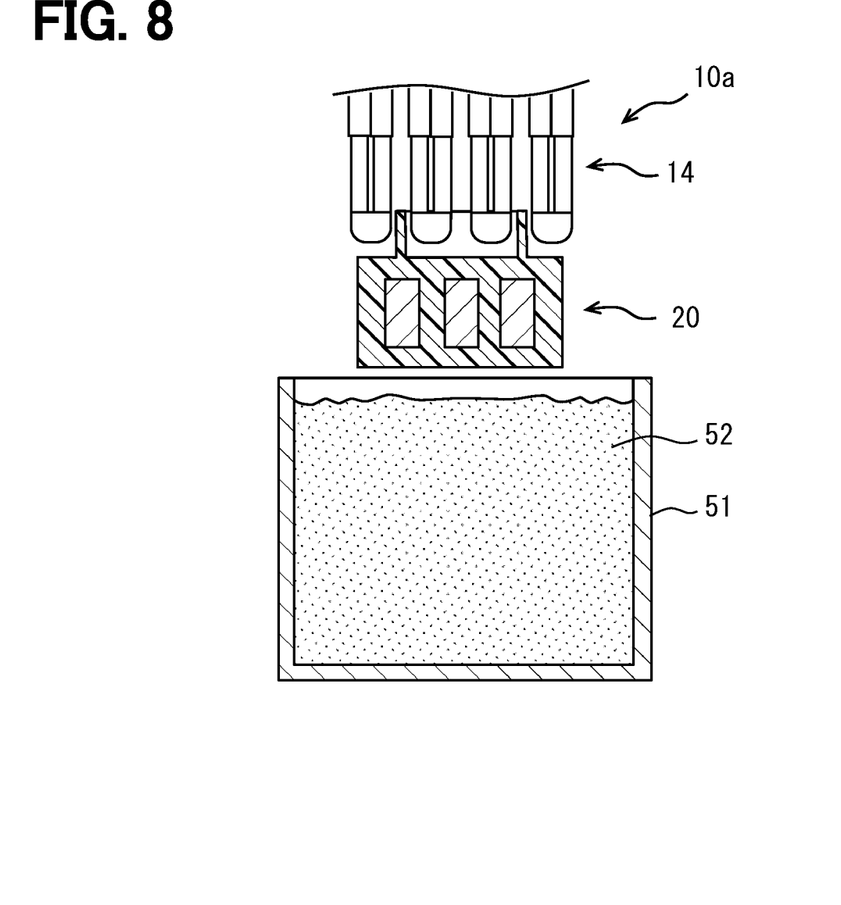
FIG. 8 is a cross-sectional view showing a powder step.

FIG. 8 shows the intermediate product 10a and the powder tank 51 at an initial stage of step 174. The intermediate product 10a is not applied with the resin member 40. The intermediate product 10a has the coil end 14 and the connection unit 20. The coil end 14 and the connection unit 20 are preheated. The raw material of the powder 52 of the resin member 40 is stored in the powder tank 51 in a fluid state.

Figure 9:
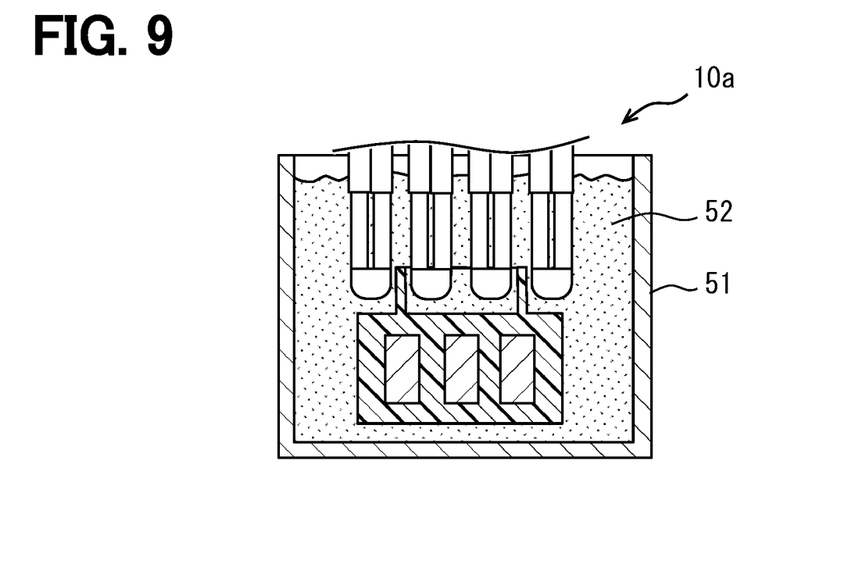
FIG. 9 is a cross-sectional view showing a powder step.

FIG. 9 shows the intermediate product 10a and the powder tank 51 at an initial stage of step 174. The intermediate product 10a is immersed in the powder tank 51. At this time, the raw material of the powder 52 reaches a range where the resin member 40 is planned to be applied. The raw material of the powder 52 also reaches the inside of the container chamber 21c. Further, the raw material of the powder 52 is stored in the container chamber 21c. The raw material of the powder 52 melts at the preheated portion and adheres to the preheated portion. In this way, the resin member 40 is applied.

Figure 10:
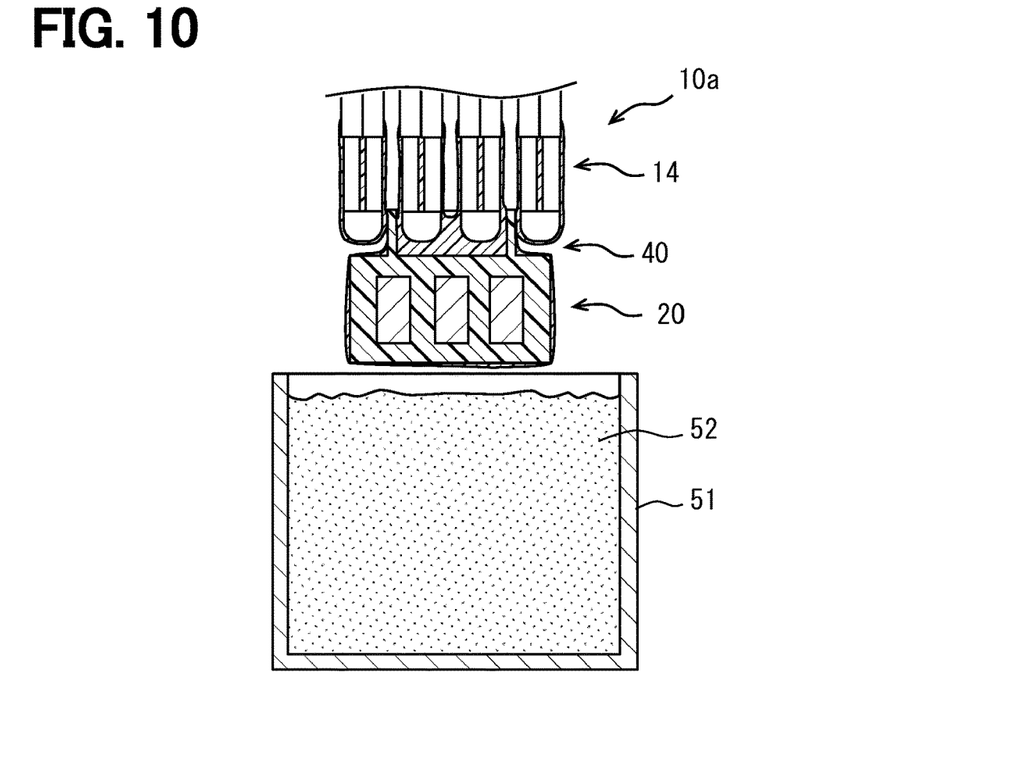
FIG. 10 is a cross-sectional view showing a powder step.

FIG. 10 shows the intermediate product 10a and the powder tank 51 at a final stage of step 174. The intermediate product 10a immediately after being taken out from the powder tank 51 includes the resin member 40 in a molten state on a surface of the preheated portion. The resin member 40 covers surfaces of the coil end 14 and the connection unit 20. Further, the resin member 40 is stored and held in the container chamber 21c. At this time, the container chamber 21c defines by the insertion member 21b functions as a container for storing the resin member 40. The resin member 40 in the molten state bridges both between the holder member 21a and the joint member 18 and between the insertion member 21b and the joint member 18. In other words, the resin member 40 in the molten state remains at least in a film form at both between the holder member 21a and the joint member 18 and between the insertion member 21b and the joining member 18. Further, the resin member 40 in the molten state remains thick and thick in the bridge gap by accumulating in the container chamber 21c.

Returning to FIG. 7, step 175 provides a curing step of curing the resin member 40 in the molten state. By curing the resin member 40 in the molten state, the resin member 40 which bridges between the holder member 21a and the joint member 18 and between the insertion member 21b and the joint member 18 is formed. By inserting the insertion member 21b into the circumferential gap and the radial gap, the insertion member 21b is partially in contact with the coil end 14. Further, by inserting the insertion member 21b into the circumferential gap and the radial gap, a plurality of bridge gaps are formed between the insertion member 21b and the coil end 14. The bridge gap is a very small gap in which a molten member may form the bridge portion 42 due to its surface tension and viscosity. The circumferential gap and the radial gap defined by the plurality of joint portions 18 are wide gaps. The circumferential gap and the radial gap allow no bridge portion 42 formed by the molten resin or is hard to form it. In other words, the molten resin is given surface tension and viscosity to form the bridge portion 42 between the insertion portion 21b and the plurality of joint portions 18. Further, the molten resin is given a surface tension and a viscosity in which the molten resin does not form the bridge portion 42 or is hard to form in the circumferential gap and the radial gap. The surface tension and viscosity of the molten resin can be adjusted by adjusting material composition of the powder. As a result, the insertion member 21b is adhered to the coil end 14 by the cured resin member 40. Step 176 provides an assembly step of assembling the rotor 4 and the stator 10 as the rotary electric machine 1.

According to the embodiment described above, the coil end 14 and the connection unit 20 are coupled by the insertion member 21b. The insertion member 21b is inserted inside the coil end 14. As a result, meshing is provided between the coil end 14 and the connection unit 20. The coil end 14 and the connection unit 20 are reliably positioned. The insertion member 21b is positioned in both the circumferential gap and the radial gap. Therefore, the coil end 14 and the connection unit 20 are reliably positioned with respect to both the radial direction and the circumferential direction. Further, the coil end 14 and the insertion member 21b are coupled by the resin member 40. Therefore, the coil end 14 and the connection unit 20 are reliably positioned with respect to the axial direction. Further, the insertion portion 21b with the cylindrical shape provides a container chamber 21c for storing the resin member 40. Therefore, the resin member 40 captured in the container chamber 21c contributes to increase a strength of the coupling.

Second Embodiment

Figure 11:
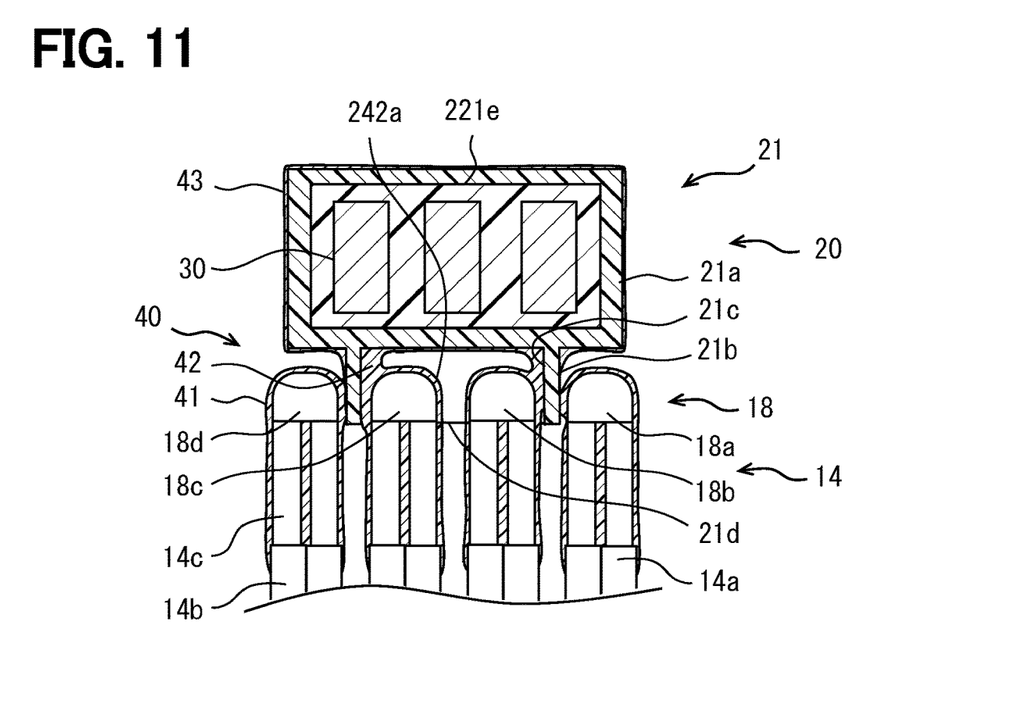
FIG. 11 is a partial cross-sectional view showing a stator of a second embodiment.

This embodiment is a modification based on the preceding embodiment. In the above embodiment, the insulator member 21 is provided by the holder member 21a which is a resin molded product. Alternatively, in this embodiment, the insulator member 21 includes a primary molded product 221e.

In FIG. 11, the insulator member 21 includes a primary molded product 221e which couples a plurality of connection conductors 30. The primary molded product 221e molds a plurality of connection conductors 30 by an insert-mold. The holder member 21a is molded as a secondary molded product which encloses the primary molded product 221e.

As described above, the insulator member 21 may be provided by a plurality of molded products.

Further, the bridge member 42 may define the cavity portion 242a. In this embodiment, a cavity extending into the container chamber 21c is formed. Even if the bridge member 42 has the cavity portion 242a, the bridge member 42 couples the insertion member 21b and the joint member 18. As a result, even if the bridge member 42 has the cavity portion 242a, the bridge member 42 couples the insertion member 21b and the joint member 18. In all the embodiments disclosed herein, the cavity portion 242a is allowed.

Third Embodiment

Figure 12:
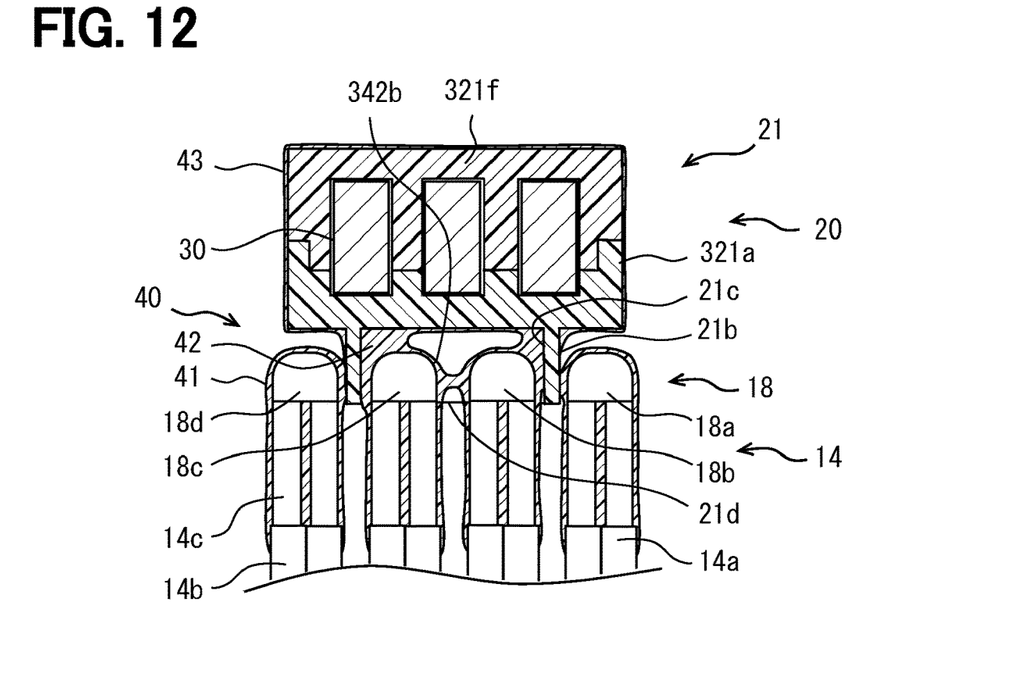
FIG. 12 is a partial cross-sectional view showing a stator of a third embodiment.

This embodiment is a modification based on the preceding embodiment. In the above embodiment, the insulator member 21 is an insert molded product that couples a plurality of connection conductors 30. Alternatively, in this embodiment, the insulator member 21 includes case components 321a and 321f which accommodate a plurality of connection conductors 30.

In FIG. 12, the insulator member 21 includes a plurality of case parts 321a and 321f. The case parts 321a and 321f define a storage chamber which accommodates a plurality of connection conductors 30. The case parts 321a and 321f are combined with each other to couple a plurality of connection conductors 30 in a predetermined positional relationship. As described above, the insulator member 21 may be provided by a combination of a plurality of components.

Further, the bridge member 42 may define the cavity portion 342b. In this embodiment, the cavity portion 342b is an independent void located within the container chamber 21c. Even if the bridge member 42 has the cavity portion 342a, the bridge member 42 couples the insertion member 21b and the joint member 18. As a result, even if the bridge member 42 has the cavity portion 342b, the bridge member 42 couples the insertion member 21b and the joint member 18. In all the embodiments disclosed herein, the cavity portion 342a is allowed.

Fourth Embodiment

Figure 13:
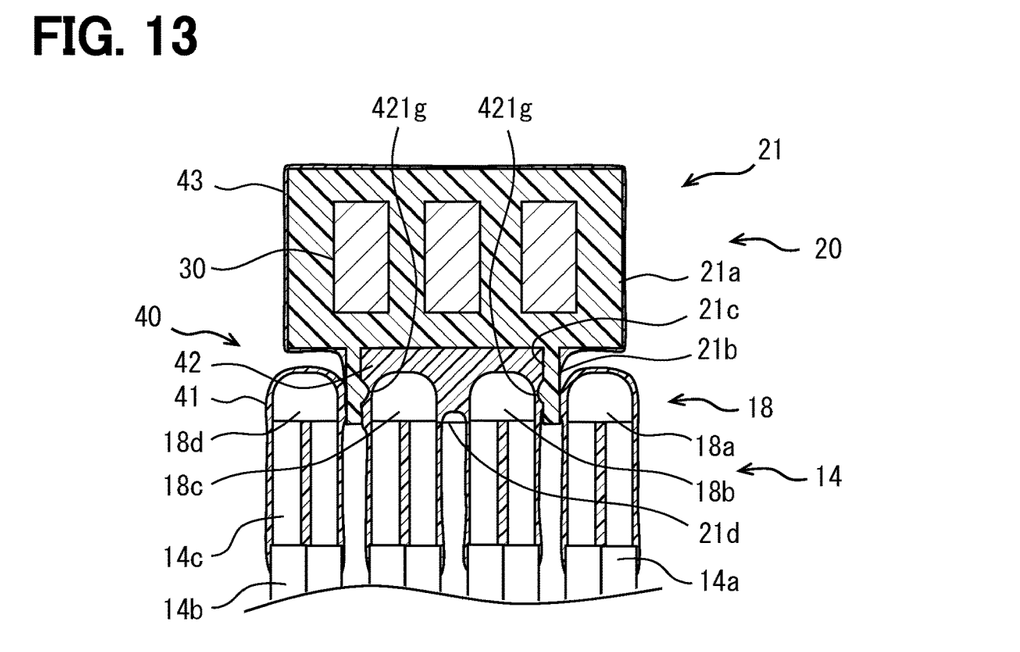
FIG. 13 is a partial cross-sectional view showing a stator of a fourth embodiment.

This embodiment is a modification based on the preceding embodiment. In the above embodiment, the insertion member 21b is provided by a straight wall. Further, the inner surface defining the container chamber 21c has a smooth surface roughness obtained in the resin molding step. In addition to this, in this embodiment, the insertion member 21b has a reinforcing structure which reinforces the coupling between the insertion member 21b and the resin member 40 in the axial direction.

In FIG. 13, the reinforcing structure is provided by a reinforcing member 421g formed in the insertion member 21b. The reinforcing member 421g reinforces the coupling with the resin member 40 in the axial direction. The reinforcing member 421g has a semicircular cross-sectional shape. The reinforcing member 421g is a raised portion protruding from the insertion member 21b toward the inside of the container chamber 21c. The reinforcing member 421g extends over the entire circumference along the opening portion 21d. The reinforcing member 421g makes a cross-sectional area of the container chamber 21c in the axial direction in a vicinity of the opening portion 21d narrower than that in an inside deep portion. The reinforcing member 421g contributes to preventing the bridge member 42 from dropping off from the container chamber 21c. The reinforcing member 421g firmly couples the insertion member 21b and the bridge member 42 in the axial direction. The reinforcing member 421g is also an undercut portion in the step of molding the insertion member 21b.

The reinforcing member 421g, which is one of the reinforcing structures, may be provided by various shapes. The shape of the reinforcing member 421g may be replaced with a wedge shape, a concave shape, a convex shape, or the like instead of the semicircular shape. Further, the reinforcing member 421g may be provided by a plurality of concave portions or convex portions intermittently arranged along the opening 21d. Further, the reinforcing member 421g may be provided by the cross-sectional shape of the entire insertion portion 21b. The cross-sectional shape of the insertion member 21b may be, for example, a tapered shape that narrows an opening area toward the opening portion 21d.

The reinforcing structure is not limited to the reinforcing member 421g. The reinforcing structures may be provided by a variety of shapes. The reinforcing structure may be provided with a plurality of very small unevenness, rough surfaces, and the like provided on an entire inner surface which defines the container chamber 21c. A very small unevenness or a rough surface improves the coupling property between the resin member 40 and the insulator member 21.

Fifth Embodiment

Figure 14:
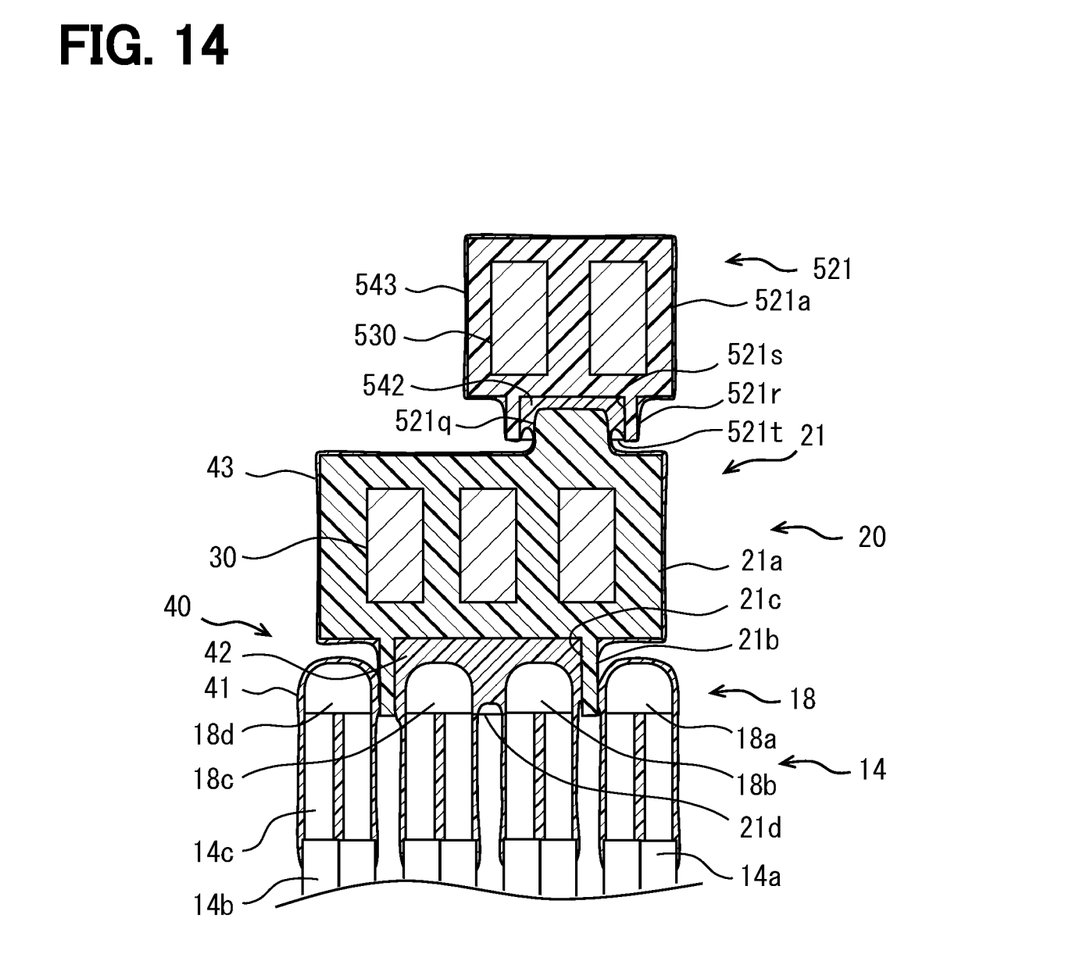
FIG. 14 is a partial cross-sectional view showing a stator of a fifth embodiment.

This embodiment is a modification based on the preceding embodiment. In the above embodiment, the coil end 14 and the insulator member 21 are coupled by the resin member 40. In addition to this, the resin member 40 may contribute to the coupling of the plurality of insulator members 21 and 521.

In FIG. 14, the connection unit 20 includes a first insulator member 21 and a second insulator member 521. The insulator member 21 in the preceding embodiment provides a first insulator member 21. The first insulator member 21 includes a holder member 21a. The holder member 21a includes a first fitting member 521q. The first fitting member 521q is provided by the convex portion.

The second insulator member 521 is coupled to the first insulator member provided by the insulator member 21. The second insulator member 521 includes a holder member 521a which holds one or a plurality of connection conductors 530. The holder member 521a is made of an insulating material. The holder member 521a includes a second fitting member 521r. The first fitting member 521q and the second fitting member 521r may be fitted to each other while forming a gap between them. The first fitting member 521q and the second fitting member 521r provide a concave-convex fitting mechanism. The first fitting member 521q and the second fitting member 521r may have an opposite concave-convex relationship. The second fitting member 521r defines the container chamber 521s. The second fitting member 521r has an opening portion 521t. The opening portion 521t may accept the first fitting member 521q.

The resin member 40 includes a bridge member 542. The bridge member 542 is positioned between the first insulator member 21 and the second insulator member 521, and couples the first insulator member 21 and the second insulator member 521. The bridge member 542 couples the first fitting member 521q and the second fitting member 521r. In this embodiment, the bridge member 542, the protective layer 41, and the bridge member 42 are integrally formed by the continuous resin member 40. The resin member 40 has a coating layer 543. The coating layer 543 covers the second insulator member 521. The coating layer 543 covers the exposed surface of the connection conductor 530. The method of manufacturing a rotary electric machine includes a step of temporarily fixing the first insulator member 21 and the second insulator member 521. In the method of manufacturing a rotary electric machine, in the above-mentioned powder step, the first insulator member 21 and the second insulator member 521 are coupled by the resin member 40.

According to this embodiment, the resin member 40 may be used for coupling the coil end 14 and the connection unit 20. Further, according to this embodiment, the resin member 40 may be used for coupling the first insulator member 21 and the second insulator member 521.

Other Embodiments

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional members which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

In the above embodiments, the rotary electric machine 1 provides an electric motor. Alternatively, the rotary electric machine 1 may provide an electric motor. In this case, the stator coil 12 is also called a field winding. Alternatively, the rotary electric machine 1 may provide a generator. In this case, the stator coil 12 is also called an armature winding.

In the above embodiment, the stator coil 12 has coil ends 14 and 15 at both ends of the stator core 11. The coil end 14 is arranged so as to face the opening portion 22. The coil end 14 can be provided in various forms. In one form, the stator coil 12 may be formed by winding a plurality of continuous conductors. In this case, the coil end 14 is provided by a group of bend portions of continuous wires. In one other form, the stator coil 12 may be provided by a plurality of segment conductors. In this case, the coil end 14 is provided by turn portions of the segment conductors or joint members joining a plurality of segment conductors. The segment conductor may be a U-shaped, J-shaped or I-shaped. The shape of such a coil end is disclosed in, for example, Patent Literature 2, i.e., JP2000-166150. Patent Literature 2 is incorporated by reference in its entirety in this application. The plurality of segment conductors may be connected by a plurality of connecting conductors arranged at the coil end 14. The shape of such a coil end is disclosed in, for example, Patent Literature 3, i.e., JP2018-125924. Patent Literature 3 is incorporated by reference in its entirety in this application.

In the above embodiments, the coil end 14 has four layers of joint members 18a, 18b, 18c, and 18d along the radial direction. Alternatively, the coil end 14 may have one or more layers (e.g., 1 layer, 2 layers, 3 layers, 5 layers, 6 layers, etc.) along the radial direction.

In the above embodiment, one phase is provided by a plurality of phase coils connected in parallel. Alternatively, a series connection may be included in one phase. For example, one phase may be provided by connecting two phase coils connected in parallel and two phase coils connected in parallel in series.

In the above embodiment, the insertion member 21b is positioned within a range of the holder member 21a. Alternatively, the insertion member 21b may be arranged so as to be shifted in the radial direction or the circumferential direction from the holder member 21a. For example, an insertion member 21b extending in the radial direction or the circumferential direction from the holder member 21a is provided. In this case, for example, the holder member 21a may be arranged in the axial direction of the joint members 18d and 18c, and the insertion member 21b may be arranged so as to accommodate the joint members 18c and 18b.

In the above embodiment, the insertion member 21b is a quadrangular tubular wall having an opening portion 21d. Alternatively, the insertion member 21b may be a member in which the resin member 40 forms the bridge member 42.

In the above embodiments, the insertion member 21b accommodates only the joint members 18b and 18c of the intermediate layer. Alternatively, the insertion member 21b may accommodate the outermost layer joint member 18a and/or the innermost layer joint member 18d. Further, the insertion member 21b may accommodate one or two or more of a plurality of joint members 18. The insertion member 21b may be, for example, a tubular wall accommodating only one joint member 18. The insertion member 21b may be, for example, a tubular wall accommodating only two joint members 18. The joint members 18 to be accommodated are adjacent to each other in the radial direction or the circumferential direction. The insertion member 21b may accommodate, for example, a joint member 18 belonging to three or more radial trains.

In the above embodiments, the insertion member 21b defines the container chamber 21c for storing the resin member 40. Alternatively, the insertion member 21b may have a shape that does not store the resin member 40 against gravity. The insertion section 21b may be provided, for example, by two right-angled intersecting walls, an arcuate wall, or a corrugated wall. Also in these modified examples, the insertion member 21b is inserted into the coil end 14. Further, the resin member 40 adheres the insulator member 21 and the coil end 14 by forming the bridge member 42.

In the above embodiments, a conductor having a quadrilateral cross section is exemplified as the connection conductor 30. Alternatively, the connection conductor 30 may be provided by a conductor having various cross-sectional shapes such as a circular cross section, an elliptical cross section, and a petal-shaped cross section.

In the above embodiments, the insertion member 21b is inserted into the coil end 14 along the axial direction. Alternatively, the insertion member 21b may be inserted into the coil end 14 along the radial direction.

What is claimed is:

1. A stator of a rotary electric machine, the stator comprising:
   a coil end of a stator coil, the coil end protruding axially from a plurality of slots of a stator core;
   a connection unit which is arranged in an axial direction of the coil end and includes a connection conductor;
   an insertion member which extends from the connection unit toward the coil end and is inserted into the coil end; and
   a resin member comprising a bridge member which (i) is positioned between the coil end and the insertion member and (ii) couples the coil end and the insertion member,
   wherein the coil end includes a plurality of segment conductors that each connect one straight member of the stator coil that is positioned in one of the plurality of slots to another straight member of the stator coil that is positioned in a different one of the plurality of slots, and
   wherein the insertion member is inserted into a gap between the plurality of segment conductors forming the coil end.

2. The stator of a rotary electric machine claimed in claim 1, wherein
   the plurality of segment conductors of the coil end form a circumferential gap and a radial gap at the coil end, and wherein
   the insertion member is inserted into both the circumferential gap and the radial gap.

3. The stator of a rotary electric machine claimed in claim 1, wherein
   the coil end includes a plurality of joint members connecting the plurality of segment conductors, wherein
   the insertion member defines a container chamber which accommodates at least one of the plurality of joint members.

4. The stator of a rotary electric machine claimed in claim 3, further comprising
   a protective layer which protects the plurality of joint members, wherein
   the resin member is continuous and comprises the bridge member and the protective layer.

5. The stator of a rotary electric machine claimed in claim 1, wherein
   the connection unit includes a plurality of the connection conductors and an insulator member made of an insulator resin which holds the plurality of connection conductors in an electrically insulated manner, wherein
   the insertion member extends from the insulator member.

6. The stator of a rotary electric machine claimed in claim 5, wherein:
   the insulator member is a first insulator member;
   the bridge member is a first bridge member; and
   the stator further comprises:
      a second insulator member connected to the first insulator member; and
      a second bridge member which (i) is resin, (ii) is positioned between the first insulator member and the second insulator member, and (iii) couples the first insulator member and the second insulator member.

7. The stator of a rotary electric machine claimed in claim 1, wherein
   the insertion member has a reinforcing structure which reinforces a coupling between the insertion member and the resin member.

8. A rotary electric machine comprising:
   the stator of a rotary electric machine claimed in claim 1;
   a rotor magnetically coupled to the stator; and
   a housing for accommodating the stator and the rotor.

9. The stator of a rotary electric machine claimed in claim 1, wherein
   the plurality of segment conductors are continuous turn members.

10. The stator of a rotary electric machine claimed in claim 1, wherein the plurality of segment conductors are joint members that each join one straight member of the stator coil that is positioned in one of the plurality of slots to another straight member of the stator coil that is positioned in a different one of the plurality of slots.

11. A manufacturing method of a rotary electric machine, the method comprising:

an inserting step of inserting an insertion member, which extends from a connection unit including a connection conductor, into a coil end of a stator coil, the coil end protruding axially from a plurality of slots of a stator core; and a coupling step of applying a resin member between the coil end and the insertion member so as to form a bridge member which (i) couples the coil end and the insertion member and (ii) is positioned between the coil end and the insertion member, wherein the coil end includes a plurality of segment conductors that each connect one straight member of the stator coil that is positioned in one of the plurality of slots to another straight member of the stator coil that is positioned in a different one of the plurality of slots, and wherein the insertion member is inserted into a gap between the plurality of segment conductors forming the coil end.

12. The manufacturing method of the rotary electric machine claimed in claim 11, further comprising:

a joining step of forming a plurality of joint members by connecting the plurality of segment conductors, prior to the coupling step, wherein the coupling step is also a protective step of forming a protective layer covering the plurality of joint members by the resin member.

* * * * *